United States Patent
Lee et al.

(10) Patent No.: US 11,577,971 B2
(45) Date of Patent: Feb. 14, 2023

(54) COMPOSITION FOR FORMING REVERSE OSMOSIS MEMBRANE PROTECTION LAYER, METHOD FOR PREPARING REVERSE OSMOSIS MEMBRANE USING SAME, REVERSE OSMOSIS MEMBRANE, AND WATER TREATMENT MODULE

(71) Applicant: LG CHEM, LTD., Seoul (KR)

(72) Inventors: Ayoung Lee, Daejeon (KR); Sung Kyung Park, Daejeon (KR); Chong Kyu Shin, Daejeon (KR); Bong Ju Kwak, Daejeon (KR)

(73) Assignee: LG CHEM, LTD., Seoul (KR)

( * ) Notice: Subject to any disclaimer, the term of this patent is extended or adjusted under 35 U.S.C. 154(b) by 741 days.

(21) Appl. No.: 16/317,776

(22) PCT Filed: Sep. 29, 2017

(86) PCT No.: PCT/KR2017/010989
§ 371 (c)(1),
(2) Date: Jan. 14, 2019

(87) PCT Pub. No.: WO2018/074767
PCT Pub. Date: Apr. 26, 2018

(65) Prior Publication Data
US 2019/0291058 A1    Sep. 26, 2019

(30) Foreign Application Priority Data

Oct. 20, 2016  (KR) .................... 10-2016-0136571
Sep. 28, 2017  (KR) .................... 10-2017-0126158

(51) Int. Cl.
*C02F 1/44*       (2006.01)
*B01D 61/02*    (2006.01)
(Continued)

(52) U.S. Cl.
CPC ............ *C02F 1/441* (2013.01); *B01D 61/025* (2013.01); *B01D 67/0006* (2013.01);
(Continued)

(58) Field of Classification Search
CPC ..... C08L 71/02; B01D 71/56; B01D 2323/30; B01D 61/025; B01D 69/125;
(Continued)

(56) References Cited

U.S. PATENT DOCUMENTS 7,815,987 B2 * 10/2010 Mickols ............. B01D 67/0093
428/36.5
8,770,414 B2    7/2014 Lee et al.
(Continued)

FOREIGN PATENT DOCUMENTS

JP    H10-066845    3/1998
JP    2012510893    5/2012
(Continued)

OTHER PUBLICATIONS

Hu et al., "Enhancing the performance of aromatic polyamide reverse osmosis membrane by surface modification via covalent attachment of polyvinyl alcohol (PVA)," Journal of Membrane Science 501: 209-219 (2016).
(Continued)

*Primary Examiner* — Bobby Ramdhanie
*Assistant Examiner* — Donovan Bui-Huynh
(74) *Attorney, Agent, or Firm* — Dentons US LLP

(57) ABSTRACT

The present specification provides a composition comprising a material of Chemical Formula 1:
(Continued)

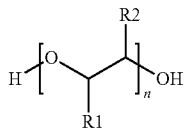

having a molecular weight of 500,000 to 700,000 where R1 and R2 are the same as or different from each other, and each independently is hydrogen, deuterium, or an alkyl group, and n is from 10,000 to 20,000, for forming a reverse osmosis membrane protective layer, a method for preparing a reverse osmosis membrane using the same, a reverse osmosis membrane and a water-treatment module.

13 Claims, 1 Drawing Sheet

(51) Int. Cl.
| | |
|---|---|
| B01D 67/00 | (2006.01) |
| B01D 69/02 | (2006.01) |
| B01D 69/12 | (2006.01) |
| B01D 71/56 | (2006.01) |
| C09D 129/04 | (2006.01) |
| B01D 71/38 | (2006.01) |
| B01D 71/06 | (2006.01) |
| B01D 71/52 | (2006.01) |
| C08J 7/04 | (2020.01) |
| B01D 69/10 | (2006.01) |

(52) U.S. Cl.
CPC ......... *B01D 67/0088* (2013.01); *B01D 69/02* (2013.01); *B01D 69/12* (2013.01); *B01D 69/125* (2013.01); *B01D 71/06* (2013.01); *B01D 71/38* (2013.01); *B01D 71/52* (2013.01); *B01D 71/56* (2013.01); *C02F 1/44* (2013.01); *C08J 7/0427* (2020.01); *C09D 129/04* (2013.01); *B01D 69/10* (2013.01); *B01D 2323/30* (2013.01); *B01D 2323/32* (2013.01); *B01D 2323/40* (2013.01); *B01D 2325/36* (2013.01); *C08J 2379/08* (2013.01); *C08J 2429/04* (2013.01); *C08J 2471/02* (2013.01)

(58) Field of Classification Search
CPC ............ B01D 67/0088; B01D 67/0093; B01D 69/12; B01D 2325/34; B01D 2325/36; B01D 69/02; B01D 2323/02; B01D 2323/32; B01D 2323/38; B01D 2323/40; B01D 61/002; B01D 61/005; B01D 67/0006; B01D 69/10; B01D 71/027; B01D 71/06; B01D 71/38; B01D 71/52; B01D 71/70; B01D 67/00; B01D 61/02; B01D 61/00; A61L 27/34; A61L 29/085; A61L 31/10; Y02A 20/131; C02F 1/441; C02F 1/44; C02F 2103/08; C02F 2303/22; C08J 7/0427; C08J 2379/08; C08J 2429/04; C08J 2465/02; C08J 2471/02; C08J 7/04; B05D 1/18; B05D 7/04; C09D 129/04; Y10T 428/1376; Y10T 428/261; Y10T 428/264; Y10T 428/31511; Y10T 428/31725; Y10T 428/31855; Y10T 428/31909; Y10T 428/31913; Y10T 428/31928; Y10T 428/31935

See application file for complete search history.

(56) References Cited

U.S. PATENT DOCUMENTS

| | | | |
|---|---|---|---|
| 10,112,154 B2 | 10/2018 | Lee et al. | |
| 2003/0087099 A1 | 5/2003 | Merrill et al. | |
| 2007/0251883 A1* | 11/2007 | Niu | B01D 61/025 264/41 |
| 2009/0220690 A1 | 9/2009 | Niu et al. | |
| 2012/0048799 A1* | 3/2012 | Na | B01D 71/40 427/244 |
| 2012/0318729 A1 | 12/2012 | Yip et al. | |
| 2013/0306550 A1* | 11/2013 | Jeong | B01D 65/08 427/244 |
| 2014/0183128 A1* | 7/2014 | Lee | B01D 61/025 427/244 |
| 2014/0224728 A1* | 8/2014 | Kim | B01D 67/00 210/500.33 |
| 2014/0251892 A1* | 9/2014 | Lee | B01D 67/0088 427/407.1 |
| 2014/0251897 A1* | 9/2014 | Livingston | B01D 69/125 427/508 |
| 2014/0319049 A1* | 10/2014 | Tang | B01D 69/12 427/244 |
| 2015/0083660 A1* | 3/2015 | Kim | B01D 69/125 427/244 |
| 2015/0375179 A1* | 12/2015 | Kim | B01D 67/0093 210/488 |
| 2016/0129401 A1* | 5/2016 | Furuno | B01D 69/10 210/483 |
| 2016/0166993 A1* | 6/2016 | Lee | B01D 69/12 210/500.28 |
| 2016/0220968 A1* | 8/2016 | Kwon | B01D 71/80 |
| 2017/0001153 A1* | 1/2017 | Ichinose | B01D 71/021 |
| 2018/0272286 A1 | 9/2018 | Gronwald et al. | |

FOREIGN PATENT DOCUMENTS

| | | |
|---|---|---|
| JP | 2012250192 | 12/2012 |
| JP | 5397772 | 1/2014 |
| JP | 20150229159 | 12/2015 |
| JP | 2016531738 | 10/2016 |
| JP | 2018528856 | 10/2018 |
| KR | 10-1999-0019008 | 3/1999 |
| KR | 10-2009-0006130 | 1/2009 |
| KR | 10-2013-0028850 | 3/2013 |
| KR | 10-2014-0034987 | 3/2014 |
| KR | 10-2015-0078245 | 7/2015 |
| WO | 94/02662 | 2/1994 |
| WO | 2014133133 | 9/2014 |
| WO | 2017045983 | 3/2017 |

OTHER PUBLICATIONS

Wang et al., "Fabrication and anti-fouling properties of photochemically and thermally immobilized poly(ethylene oxide) and low molecular weight poly(ethylene glycol) thin films," Journal of Colloid and Interface Science 354: 160-167 (2011).
Zhao et al., "High-flux and fouling-resistant membranes for brackish water desalination," Journal of Membrane Science 425-426: 1-10 (2013).

\* cited by examiner

[FIG. 1]
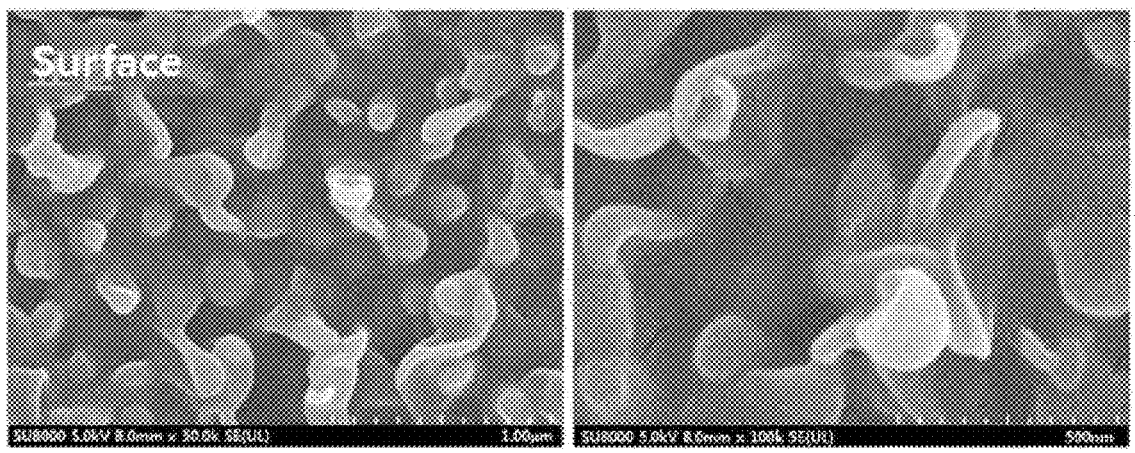
[FIG. 2]
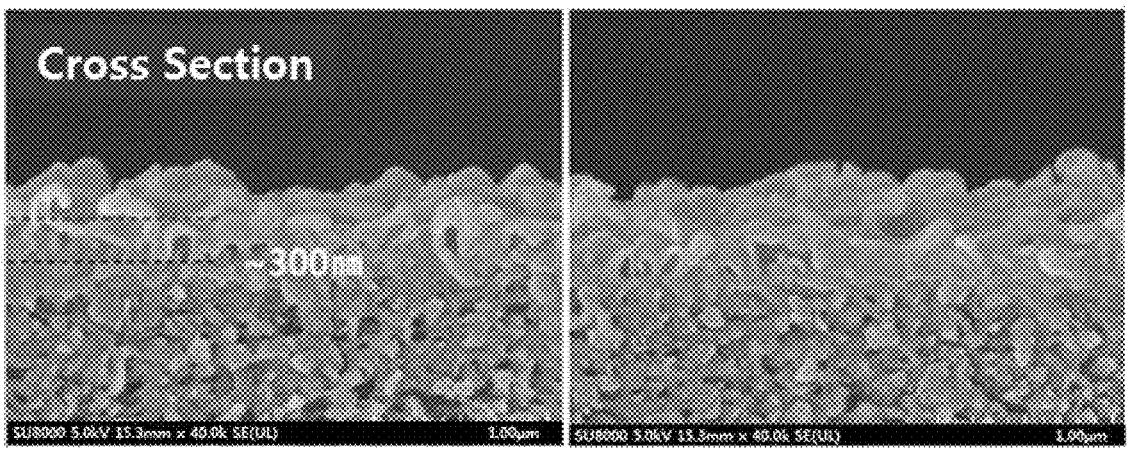

COMPOSITION FOR FORMING REVERSE OSMOSIS MEMBRANE PROTECTION LAYER, METHOD FOR PREPARING REVERSE OSMOSIS MEMBRANE USING SAME, REVERSE OSMOSIS MEMBRANE, AND WATER TREATMENT MODULE

This application is a National Stage Application of International Application No. PCT/KR2017/010989 filed on Sep. 29, 2017, which claims priority to and the benefits of Korean Patent Application No. 10-2016-0136571, filed with the Korean Intellectual Property Office on Oct. 20, 2016, and Korean Patent Application No. 10-2017-0126158, filed with the Korean Intellectual Property Office on Sep. 28, 2017, the entire contents of which are incorporated herein by reference in their entirety for all purposes as if fully set forth herein.

TECHNICAL FIELD

BACKGROUND ART

Developing a new source of water resources has surfaced as an urgent facing challenge due to recent serious pollution of water quality environments and water shortage. Researches on the pollution of water quality environments aim for high-quality residential and industrial water, and treatment of various domestic sewage and industrial wastewater, and interests in water-treatment processes using a separation membrane with an advantage of energy saving has been rising. In addition, accelerated reinforcement on environment regulations is expected to advance wide utilization of separation membrane technologies. Traditional water-treatment processes are difficult to satisfy the tightened regulations, however, separation membrane technologies secure excellent treatment efficiency and stable treatment, therefore, are expected to become a leading technology in the field of water-treatment in the future.

Liquid separation is divided into microfiltration, ultrafiltration, nanofiltration, reverse osmosis, stannizing, active transport, electrodialysis, and the like, depending on the pore of the membrane. Among these, the reverse osmosis method refers to a process of desalinization using a semipermeable membrane permeating water but having impermeableness for salts, and when salt-dissolved high-pressure water is introduced to one side of the semipermeable membrane, salt-removed pure water comes out of the other side with a low pressure.

Specifically, typical examples of such a water-treatment membrane include a polyamide-based water-treatment membrane, and the polyamide-based water-treatment membrane is manufactured using a method in which a microporous support is formed by forming a polysulfone layer on a nonwoven fabric, this microporous support is immersed in an aqueous m-phenylenediamine (mPD) solution to form an mPD layer, and this mPD layer is brought into contact with trimesoyl chloride (TMC) by being immersed in a TMC organic solvent, or coated, and is interfacial polymerized to form a polyamide active layer. According to such a manufacturing method, a non-polar solvent and a polar solvent are in contact with each other, and polymerization occurs only at the interface, and as a result, a polyamide active layer having a very small thickness is formed.

Meanwhile, there is a qualification for a polyamide-based water-treatment membrane to be commercially used, and it is having superior performance as a separation membrane such as high salt rejection and flux. Salt rejection of a separation membrane commercially required is at least 97% or greater for brackish water, and an ability to pass through a relatively large amount of water under a relatively low pressure, that is, a high flux property, is required.

Meanwhile, preventing membrane contamination of a water-treatment membrane has emerged as an important challenge together with enhancing performance such as salt rejection and flux. Membrane contamination means suspended matters or dissolved matters adsorbing or attaching to the membrane surface, and when contamination occurs, flux is reduced, and microorganisms adsorb and grow on the separation membrane surface due to contaminants readily causing secondary contamination foiling a bio-film on the separation membrane surface. The contaminated separation membrane has declined penetrability, and it is not preferred since, in order to obtain permeated water in a certain flux, the pressure needs to be frequently corrected, or when the membrane contamination is serious, the membrane needs to be washed.

Accordingly, development of more economical methods for preparing a reverse osmosis membrane having high flux while having excellent salt rejection by preventing membrane contamination has been required.

DISCLOSURE

Technical Problem

The present specification is directed to providing a composition for forming a reverse osmosis membrane protective layer and a method for preparing a reverse osmosis membrane using the same.

Technical Solution

One embodiment of the present specification provides a composition for forming a reverse osmosis membrane protective layer comprising a material of Chemical Formula 1 and having a weight average molecular weight of 500,000 to 700,000.

[Chemical Formula 1]

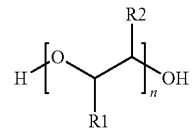

wherein: R1 and R2 are the same as or different from each other, and each independently is hydrogen, deuterium, or a substituted or unsubstituted alkyl group, and n is from 10,000 to 20,000.

Another embodiment of the present specification provides a method for preparing a reverse osmosis membrane comprising forming a polyamide active layer on a porous support; and forming a protective layer on the polyamide active layer using the composition for forming a reverse osmosis membrane protective layer described above.

Another embodiment of the present specification provides a reverse osmosis membrane comprising a porous support; a polyamide active layer provided on the porous support; and a protective layer famed on the polyamide active layer, wherein the protective layer comprises the material described above or a crosslinked product thereof.

Another embodiment of the present specification provides a water-treatment module comprising one or more of the reverse osmosis membranes described above.

Another embodiment of the present specification provides a water-treatment system comprising one or more of the water-treatment modules described above.

Advantageous Effects

A reverse osmosis membrane prepared using a composition for forming a reverse osmosis membrane protective layer according to one embodiment of the present specification exhibits high salt rejection and boron rejection of 99.89% or greater by crosslink-coating a polymer having viscoelasticity on a protective layer.

In addition, the reverse osmosis membrane prepared using a composition for forming a reverse osmosis membrane protective layer according to one embodiment of the present specification increases mechanical strength by the crosslink-coating, and thereby minimizes damages to the reverse osmosis membrane.

DESCRIPTION OF DRAWINGS

FIG. 1 shows a surface of a reverse osmosis membrane according to one embodiment of the present specification.

FIG. 2 shows a cross section of a protective layer in a reverse osmosis membrane according to one embodiment of the present specification.

MODE FOR DISCLOSURE

In the present specification, a description of a certain member being placed "on" another member includes not only a case of the one member adjoining the another member but a case of still another member being present between the two members.

In the present specification, a description of a certain part "comprising" certain constituents means capable of further comprising other constituents, and does not exclude other constituents unless particularly stated on the contrary.

Hereinafter, the present specification will be described in more detail.

One embodiment of the present specification provides a composition for forming a reverse osmosis membrane protective layer comprising a material of Chemical Formula 1 and having a weight average molecular weight of 500,000 to 700,000.

[Chemical Formula 1]

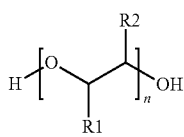

In Chemical Formula 1, R1 and R2 are the same as or different from each other, and each independently hydrogen; deuterium; or a substituted or unsubstituted alkyl group, and n is from 10,000 to 20,000.

According to one embodiment of the present specification, R1 and R2 are the same as or different from each other, and each independently a substituted or unsubstituted alkyl group having 1 to 10 carbon atoms.

According to one embodiment of the present specification, R1 and R2 may be hydrogen.

According to one embodiment of the present specification, the alkyl group may be linear, branched or cyclic. In addition, according to one embodiment of the present specification, the alkyl group may be a methyl group, an ethyl group, an n-propyl group, an iso-propyl group, an n-butyl group, a sec-butyl group, a t-butyl group, an n-pentyl group, an iso-pentyl group, a neo-pentyl group, an n-hexyl group, a cyclopropyl group, a cyclobutyl group, a cyclopentyl group or a cyclohexyl group. However, the alkyl group is not limited thereto.

According to one embodiment of the present specification, n may be from 10,000 to 20,000, preferably from 11,000 to 16,000, and more preferably from 12,000 to 15,000.

According to one embodiment of the present specification, the material having a weight average molecular weight of less than 500,000 functions as impurities in a protective layer comprising the material reducing salt rejection and flux, and when the weight average molecular weight is greater than 700,000, flux may decrease due to the excessive molecular weight.

According to one embodiment of the present specification, the material content may be from 0.3% by weight to 0.5% by weight and more preferably from 0.4% by weight to 0.5% by weight based on the total weight of the composition for forming a reverse osmosis membrane protective layer. When the material content is less than 0.3% by weight, a reaction of the material may not occur in the overall protective layer, and accordingly, the protective layer may be partially formed on the membrane, and salt rejection and boron rejection may decrease. When the material content is greater than 0.5% by weight, the protective layer is excessively formed on the polyamide membrane surface reducing flux.

According to one embodiment of the present specification, the composition for forming a reverse osmosis membrane protective layer may further comprise one or more of a hydrophilic polymer and a crosslinking agent.

According to one embodiment of the present specification, the composition for forming a reverse osmosis membrane protective layer may further comprise a hydrophilic polymer.

According to one embodiment of the present specification, the composition for forming a reverse osmosis membrane protective layer may further comprise a crosslinking agent.

According to one embodiment of the present specification, the composition for forming a reverse osmosis membrane protective layer may further comprise a hydrophilic polymer and a crosslinking agent.

More specifically, the hydrophilic polymer may be polyvinyl alcohol (PVA), and the crosslinking agent may be glutaraldehyde (GA). When the composition for forming a reverse osmosis membrane protective layer further comprises one or more of the hydrophilic polymer and the crosslinking agent, the material of Chemical Formula 1 may form a crosslinked product by being crosslinked with one or more of the hydrophilic polymer and the crosslinking agent.

The polyvinyl alcohol is a hydrophilic polymer allowing a hydrophilic group to be present on the membrane surface, and as a result, resistance for pollution sources is obtained as well as obtaining an effect of flux enhancement.

The glutaraldehyde performs a role of the material crosslinking with a surface of a polyamide layer to describe later, and may contribute to enhancing salt rejection by a protective layer to describe later being physically adsorbed to the polyamide layer.

According to one embodiment of the present specification, the composition for forming a reverse osmosis membrane protective layer may further comprise water in addition to the material of Chemical Formula 1.

According to one embodiment of the present specification, the composition for forming a reverse osmosis membrane protective layer may further comprise a hydrophilic polymer in addition to the material of Chemical Formula 1, and the rest may be water.

According to one embodiment of the present specification, the composition for forming a reverse osmosis membrane protective layer may further comprise a crosslinking agent in addition to the material by of Chemical Formula 1, and the rest may be water.

According to one embodiment of the present specification, the composition for forming a reverse osmosis membrane protective layer may further comprise a hydrophilic polymer and a crosslinking agent in addition to the material of Chemical Formula 1, and the rest may be water.

According to one embodiment of the present specification, the composition for forming a reverse osmosis membrane protective layer may be formed with the material of Chemical Formula 1, a hydrophilic polymer, a crosslinking agent and the remainder of water.

According to one embodiment of the present specification, the hydrophilic polymer content may be from 0.1% by weight to 10% by weight, preferably from 0.1% by weight to 5% by weight, and more preferably from 1% by weight to 4% by weight based on the total weight of the composition for forming a reverse osmosis membrane protective layer.

According to one embodiment of the present specification, the crosslinking agent content may be from 0.01% by weight to 10% by weight, preferably from 0.01% by weight to 5% by weight, and more preferably from 0.1% by weight to 2% by weight based on the total weight of the composition for forming a reverse osmosis membrane protective layer.

According to one embodiment of the present specification, the material of Chemical Formula 1 is a polymer having more viscoelasticity than polyvinyl alcohol, and exhibits high salt rejection of 99.89% or greater and enhanced boron rejection compared to when coating only polyvinyl alcohol as a protective layer.

According to one embodiment of the present specification, a reverse osmosis membrane comprising a protective layer formed using a composition for forming a protective layer comprising the material of Chemical Formula 1 exhibits salt rejection of 99.89% or greater and preferably 99.9% or greater.

According to one embodiment of the present specification, a reverse osmosis membrane comprising a protective layer formed using a composition for forming a protective layer comprising the material of Chemical Formula 1 exhibits boron rejection of 93% or greater, preferably 93.2% or greater, and more preferably 94.3% or greater.

According to one embodiment of the present specification, a reverse osmosis membrane comprising a protective layer famed using a composition for forming a protective layer comprising the material represented by Chemical Formula 1 exhibits salt rejection of 99.89% or greater and preferably 99.9% or greater.

According to one embodiment of the present specification, a reverse osmosis membrane comprising a protective layer famed using a composition for forming a protective layer comprising the material represented by Chemical Formula 1 exhibits boron rejection of 93% or greater, preferably 93.2% or greater, and more preferably 94.3% or greater.

Another embodiment of the present specification provides a method for preparing a reverse osmosis membrane comprising forming a polyamide active layer on a porous support; and forming a protective layer on the polyamide active layer using the composition described above.

According to one embodiment of the present specification, those forming a coating layer made of polymer materials on a nonwoven fabric may be used as the support. Examples of the polymer material may include polysulfone, polyether sulfone, polycarbonate, polyethylene oxide, polyimide, polyether imide, polyetheretherketone, polypropylene, polymethylpentene, polymethyl chloride, polyvinylidene fluoride or the like, but are not limited thereto. Specifically, polysulfone may be used as the polymer material.

According to one embodiment of the present specification, the polyamide active layer may be formed through interfacial polymerization of an aqueous solution comprising an amine compound and an organic solution comprising an acyl halide compound. Specifically, the polyamide active layer may be formed through forming an aqueous solution layer comprising an amine compound on a porous support; and forming a polyamide active layer on the aqueous solution layer by bringing an organic solution comprising an acyl halide compound and an organic solvent into contact with the aqueous solution layer comprising an amine compound.

When the aqueous solution layer comprising an amine compound and the organic solution are brought into contact with each other, polyamide is produced by interfacial polymerization while the amine compound and the acyl halide compound coated on the surface of the porous support react, and the result is adsorbed to a microporous support to form a thin film. In the contact method, the polyamide active layer may be also formed through methods such as immersion, spray or coating.

According to one embodiment of the present specification, the method of foaming an aqueous solution layer comprising an amine compound on the porous support is not particularly limited, and any method capable of forming an aqueous solution layer on a support may be used without limit. Specifically, the method of forming an aqueous solution layer comprising an amine compound on the porous support may include spraying, coating, immersion, dripping or the like.

Herein, the aqueous solution layer may additionally go through a step of removing an excess aqueous solution comprising the amine compound as necessary. The aqueous solution layer formed on the porous support may be non-uniformly distributed when the aqueous solution present on the support is too much, and when the aqueous solution is non-uniformly distributed, a non-uniform polyamide active layer may be famed by interfacial polymerization thereafter. Accordingly, an excess aqueous solution is preferably removed after forming an aqueous solution layer on the support. The excess aqueous solution removal is not particularly limited, and, for example, a sponge, an air knife, nitrogen gas blowing, natural drying, a press roll or the like may be used for the removal.

According to one embodiment of the present specification, in the aqueous solution comprising an amine compound, the amine compound is not limited in the type as long as it is an amine compound used in the manufacture of a water-treatment membrane, and specific examples thereof preferably include m-phenylene-diamine (mPD), p-phenylenediamine, 1,2,4-benzenetriamine, 4-chloro-1,3-phenylenediamine, 2-chloro-1,4-phenylenediamine or mixtures thereof.

According to one embodiment of the present specification, examples of the acyl halide compound may include, but are not limited to, aromatic compounds having 2 to 3 carboxylic acid halides, and may be one or more types of mixtures selected from the chemical compound group consisting of trimesoyl chloride (TMC), isophthaloyl chloride and terephthaloyl chloride.

According to one embodiment of the present specification, as the organic solvent, aliphatic hydrocarbon solvents such as Freon and hydrophobic liquids that are not mixed with water and have 5 to 12 carbon atoms such as hexane, cyclohexane, heptane and alkane, and for example, IsoPar (Exxon), IsoPar G (Exxon), ISOL-C (SK Chem.) and ISOL-G (Exxon) and the like that are alkane having 5 to 12 carbon atoms and mixtures thereof may be used, however, the organic solvent is not limited thereto.

Next, the forming of a protective layer on the polyamide active layer may be, for example, carried out through a method of immersing the polyamide active layer-formed support into the composition for forming a reverse osmosis membrane protective layer described above, or a method of coating the composition for forming a reverse osmosis membrane protective layer described above on the polyamide active layer-formed support, however, the method is not limited thereto.

Meanwhile, the time of immersion may be properly controlled considering a thickness of a protective layer to form and the like, and for example, may be approximately from 0.1 minutes to 10 hours, and preferably approximately from 1 minute to 1 hour. When the time of immersion is less than 0.1 minutes, a protective layer is not sufficiently foiled, and when the time of immersion is longer than 10 hours, a protective layer becomes too thick having an adverse effect of reducing flux of a reverse osmosis membrane.

Another embodiment of the present specification provides a reverse osmosis membrane comprising a porous support; a polyamide active layer provided on the porous support; and a protective layer famed on the polyamide active layer, wherein the protective layer comprises the material described above or a crosslinked product thereof.

When referring to FIG. 1 showing a surface of the protective layer and FIG. 2 showing a cross section thereof, it is seen that the protective layer is crosslink-coated on the polyamide active layer in a physically adsorbed form.

According to one embodiment of the present specification, the content of the material described above may be from 5% by weight to 20% by weight, and more preferably from 10% by weight to 15% by weight based on the weight of the protective layer. When the material content is less than 5% by weight, a crosslinking property between the polyamide active layer and the protective layer declines reducing salt rejection and boron rejection, and when the material content is greater than 20% by weight, flux may decrease due to an excessive thickness of the protective layer.

According to one embodiment of the present specification, the protective layer may have a thickness of 100 nm to 300 nm. The protective layer having a thickness of less than 100 nm may readily damage the polyamide active layer, and the thickness being greater than 300 nm may reduce flux and salt rejection of the reverse osmosis membrane.

According to one embodiment of the present specification, the reverse osmosis membrane may have elastic modulus (Young's modulus) of 2 GPa or greater, and specifically 2 GPa to 10 GPa. The elastic modulus may be preferably from 4.5 GPa to 10 GPa and more preferably from 6 GPa to 10 GPa.

The elastic modulus being less 2 GPa may readily damage the reverse osmosis membrane due to insufficient mechanical strength, and when the elastic modulus is greater than 10 GPa, flexibility of the reverse osmosis membrane decreases due to mechanical strength, which may also cause damages to the reverse osmosis membrane.

The elastic modulus is measured using an atomic-force microscopy (AFM). Physical properties of the reverse osmosis membrane may be quantified, and may be quantified using the following equation.

[Young's modulus=tensile stress/extensional strain]

The term "atomic force microscopy (AFM)" of the present disclosure is a high resolution scanning probe microscopy having a resolution at a nanometer level that is higher by 1,000 times compared to general optical diffraction limits. An AFM is manufactured for overcoming disadvantages of a scanning tunneling microscopy (STM). A STM is based on a quantum tunneling concept, and thereby needs a conductive probe, and may be used in conductive or semi-conducting samples, whereas an AFM uses an atomic force, and may be widely used in a certain form of surface, for example, polymer, ceramic, composite, glass and biological samples. An AFM generally includes a probe located at the end of a cantilever, and measures a force acting between the probe end and a sample surface. Specifically, this is dependent on a spring constant of the probe-located cantilever. For example, when a spring constant of the cantilever (approximately 0.1 N/m to 1 N/m) is smaller than an interaction with a sample surface, the cantilever bends and deflection is observed.

An AFM may be operated in three different modes of 1) contact mode, 2) intermittent mode (or tapping mode) and 3) non-contact mode depending on a contact between a sample and an AFM probe. First, in the contact mode, a probe and a sample surface have a distance of less than 0.5 nm, and repulsive Van der Waals force is applied therebetween. The contact mode is capable of fast measurements and suited for rough samples, and thereby has an advantage of being used in friction analyses, however, has a disadvantage in that soft samples may be damaged or deformed. Next, in the intermittent mode, a cantilever vibrates on a certain resonance cycle, and a probe moves at a distance of 0.5 nm to 2 nm from a sample surface. The intermittent mode has advantages in that it may analyze damageable samples or samples weakly binding on a surface in high resolution, and is suited in analyzing biological samples. Meanwhile, there are disadvantages in that imaging is difficult and a scan rate is low in a liquid state. Lastly, in the non-contact mode, a probe is not in direct contact with a sample surface maintaining a distance of 0.1 nm to 10 nm from the surface, and attractive Van der Waals force is applied between the probe and the sample surface. Very small force at a pico newton ($10^{-12}$ N) level is applied on the sample, and therefore, the probe has a long lifetime. However, there is a disadvantage in that a very high degree of vacuum is required to obtain best images since resolution is low compared to other modes, and an analysis capability may be inhibited by a contaminated layer on the sample surface.

In the present specification, elastic modulus of the reverse osmosis membrane is measured using the atomic force microscopy, and when crosslink-coating the material having viscoelasticity on the protective layer, it is seen that mechanical strength of the reverse osmosis membrane is enhanced with elastic modulus of the reverse osmosis membrane being 2 Gpa or greater, preferably 4.5 GPa or greater, and more preferably 6 GPa or greater, compared to when the material is not used.

Another embodiment of the present specification provides a water-treatment module comprising one or more of the reverse osmosis membranes described above.

Specific types of the water-treatment module are not particularly limited, and examples thereof may include a plate & frame module, a tubular module, a hollow & fiber module, a spiral wound module or the like. In addition, as long as the water-treatment module comprises the reverse osmosis membrane described above, the water-treatment module is not particularly limited in other constitutions and manufacturing methods, and general means known in the art may be employed without limit.

Another embodiment of the present specification provides a water-treatment system comprising one or more of the water-treatment modules described above. The water-treatment system is useful in water-treatment systems such as household/industrial water-purification systems, sewage treatment systems or sea to fresh water treatment systems.

Hereinafter, the present specification will be described in detail with reference to examples in order to specifically describe the present specification. However, examples according to the present specification may be modified to various different forms, and the scope of the present specification is not construed as being limited to the examples described below. The examples of the present specification are provided in order to more fully describe the present specification to those having average knowledge in the art.

PREPARATION EXAMPLE

Preparation of Polyamide Active Layer-Formed Porous Support

16% by weight of a polysulfone solid was introduced to N,N-dimethylformamide (DMF) and dissolved for 12 hours or longer at 80° C. to obtain a uniform liquid phase. This solution was casted to a thickness of 45 µm to 50 µm on a non-woven fabric having a thickness of 95 µm to 100 µm made of polyester to form a porous polysulfone support.

The porous polysulfone support prepared using the above-mentioned method was formed into an aqueous solution layer using an aqueous solution comprising 4% by weight of metaphenylenediamine (mPD).

Then, a composition comprising trimesoyl chloride (TMC), 1,3,5-trimethylbenzene (TMB) and Isopar-G was coated on the aqueous solution layer to form an organic layer, and interfacial polymerization was performed to prepare a polyamide active layer-formed porous support.

EXAMPLE 1

A composition for forming a reverse osmosis membrane protective layer comprising 2% by weight of polyvinyl alcohol (PVA), 0.1% by weight of glutaraldehyde (GA) and 0.3% by weight of polyethylene oxide (PEO) having a weight average molecular weight of 600,000 was stirred for 20 minutes or longer. After that, the porous support having a polyamide active layer prepared by Preparation Example 1 was washed with high temperature (60° C.) distilled water, then the composition was coated, and the result was dried for 10 minutes in a 90° C. oven to form a protective layer and prepare a reverse osmosis membrane.

EXAMPLE 2

A reverse osmosis membrane was prepared in the same manner as in Example 1, except that a composition for forming a reverse osmosis membrane protective layer comprising 2% by weight of polyvinyl alcohol (PVA), 0.1% by weight of glutaraldehyde (GA) and 0.5% by weight of polyethylene oxide (PEO) having a weight average molecular weight of 600,000 was used instead of the composition for foaming a reverse osmosis membrane protective layer of Example 1.

EXAMPLE 3

A reverse osmosis membrane was prepared in the same manner as in Example 1, except that a composition for forming a reverse osmosis membrane protective layer comprising 2% by weight of polyvinyl alcohol (PVA) and 0.3% by weight of polyethylene oxide (PEO) having a weight average molecular weight of 600,000 was used instead of the composition for forming a reverse osmosis membrane protective layer of Example 1.

COMPARATIVE EXAMPLE 1

A reverse osmosis membrane was prepared in the same manner as in Example 1, except that a composition for forming a reverse osmosis membrane protective layer comprising 2% by weight of polyvinyl alcohol (PVA) was used instead of the composition for forming a reverse osmosis membrane protective layer of Example 1.

COMPARATIVE EXAMPLE 2

A reverse osmosis membrane was prepared in the same manner as in Example 1, except that a composition for forming a reverse osmosis membrane protective layer comprising 2% by weight of polyvinyl alcohol (PVA), 0.1% by weight of glutaraldehyde (GA) and 0.3% by weight of polyethylene oxide (PEO) having a weight average molecular weight of 200,000 was used instead of the composition for forming a reverse osmosis membrane protective layer of Example 1.

COMPARATIVE EXAMPLE 3

A reverse osmosis membrane was prepared in the same manner as in Example 1, except that a composition for forming a reverse osmosis membrane protective layer comprising 2% by weight of polyvinyl alcohol (PVA), 0.1% by weight of glutaraldehyde (GA) and 1% by weight of polyethylene oxide (PEO) having a weight average molecular weight of 200,000 was used instead of the composition for foaming a reverse osmosis membrane protective layer of Example 1.

COMPARATIVE EXAMPLE 4

A reverse osmosis membrane was prepared in the same manner as in Example 1, except that a composition for forming a reverse osmosis membrane protective layer comprising 2% by weight of polyvinyl alcohol (PVA), 0.1% by weight of glutaraldehyde (GA) and 0.3% by weight of polyethylene glycol (PEG) having a weight average molecular weight of 4,000 was used instead of the composition for forming a reverse osmosis membrane protective layer of Example 1.

COMPARATIVE EXAMPLE 5

A reverse osmosis membrane was prepared in the same manner as in Example 1, except that a composition for forming a reverse osmosis membrane protective layer comprising 2% by weight of polyvinyl alcohol (PVA), 0.1% by weight of glutaraldehyde (GA) and 3% by weight of polyethylene glycol (PEG) having a weight average molecular weight of 4,000 was used instead of the composition for forming a reverse osmosis membrane protective layer of Example 1.

COMPARATIVE EXAMPLE 6

A reverse osmosis membrane was prepared in the same manner as in Example 1, except that a composition for forming a reverse osmosis membrane protective layer comprising 2% by weight of polyvinyl alcohol (PVA) and 0.1% by weight of glutaraldehyde (GA) was used instead of the composition for forming a reverse osmosis membrane protective layer of Example 1.

EXPERIMENTAL EXAMPLE

Evaluation of Water Purification Performance

Performance of the reverse osmosis membranes prepared according to Examples 1 to 3 and Comparative Examples 1 to 6 was evaluated under 800 psi using salt water containing 32,000 ppm of NaCl and 5 ppm of boron. Salt rejection was measured by measuring a difference in the conductivity between the produced water and the original water, and a volume of the produced water secured per unit time (5 minutes) and unit area of the separation membrane was measured to calculate flux. A pH of the original water was adjusted to pH 8.

As for Young's modulus, stiffness and adhesion were measured through an electrical contact between the tip and the sample using a PinPoint Conductive AFM mode, and calculation was carried out through a Hertzian model.

Sample size: up to 50 mm×50 mm, 20 mm thickness XY stage: 20 mm×20 mm motorized stage Z stage: 25 mm motorized stage Performance of the reverse osmosis membranes according to Examples 1 to 3 and Comparative Examples 1 to 6 measured as above is as shown in the following Table 1.

TABLE 1

| | Salt Rejection (%) | Flux (GFD) | Boron Rejection (%) | Young's Modulus (GPa) |
|---|---|---|---|---|
| Example 1 | 99.92 | 12.27 | 95.0 | 6.37 |
| Example 2 | 99.93 | 11.77 | 94.3 | 6.40 |
| Example 3 | 99.89 | 12.41 | 93.2 | 5.94 |
| Comparative Example 1 | 99.85 | 15.59 | 92.2 | 4.08 |
| Comparative Example 2 | 99.86 | 8.84 | 92.1 | 4.05 |
| Comparative Example 3 | 99.87 | 7.58 | 92.3 | 4.20 |
| Comparative Example 4 | 99.62 | 8.17 | 91.5 | 4.02 |
| Comparative Example 5 | 99.45 | 6.91 | 91.3 | 3.95 |
| Comparative Example 6 | 99.65 | 9.67 | 91.7 | 3.92 |

GFD of the flux means gallon/ft$^2$day.

According to Table 1, it was seen that the reverse osmosis membranes according to Examples 1 to 3 had salt rejection of 99.89% or greater, and had excellent flux, boron rejection and mechanical strength, whereas the reverse osmosis membrane according to Comparative Example 1 comprising only polyvinyl alcohol (PVA) in the protective layer composition had low salt rejection, boron rejection and mechanical strength despite excellent flux.

In addition, when comparing Examples 1 to 3 and Comparative Examples 2 and 3, it was identified that the reverse osmosis membrane comprising polyethylene oxide (PEO) having a weight average molecular weight of 600,000 had significantly higher salt rejection, boron rejection, and flux and also had excellent mechanical strength compared to the reverse osmosis membrane comprising polyethylene oxide (PEO) having a weight average molecular weight of 200,000.

When comparing Examples 1 to 3 and Comparative Examples 4 and 5, it was identified that the reverse osmosis membrane comprising polyethylene oxide (PEO) of Chemical Formula 1 and having a weight average molecular weight of 600,000 had significantly superior salt rejection, boron rejection and flux compared to when comprising polyethylene glycol (PEG) having a weight average molecular weight of 4,000.

When comparing Examples 1 and 2 and Comparative Example 6, it was identified that salt rejection and boron rejection increased when the composition for forming a reverse osmosis membrane protective layer included all of polyvinyl alcohol (PVA), glutaraldehyde (GA) and polyethylene oxide (PEO) of Chemical Formula 1 compared to when comprising only polyvinyl alcohol (PVA) and glutaraldehyde (GA).

When comparing Examples 1 and 2 and Comparative Example 6, it was identified that salt rejection and boron rejection increased when the composition for forming a reverse osmosis membrane protective layer included all of polyvinyl alcohol (PVA), glutaraldehyde (GA) and polyethylene oxide (PEO) represented by Chemical Formula 1 compared to when comprising only polyvinyl alcohol (PVA) and glutaraldehyde (GA).

When comparing Examples 1 and 2, and Example 3, it was identified that salt rejection and boron rejection increased when the composition for forming a reverse osmosis membrane protective layer included all of polyvinyl alcohol (PVA), glutaraldehyde (GA) and polyethylene oxide (PEO) of Chemical Formula 1 compared to when comprising compared to when comprising only polyethylene oxide (PEO) of Chemical Formula 1 and polyvinyl alcohol (PVA).

Hereinbefore, preferred embodiments of the present specification have been described, however, the present disclosure is not limited thereto, and various modifications may be made within the scope of the claims and the detailed descriptions of the disclosure, and the modifications are also included in the scope of the present disclosure.

The invention claimed is:

1. A composition for forming a reverse osmosis membrane protective layer, comprising a hydrophilic polymer, glutaraldehyde as a crosslinking agent, and a compound of Chemical Formula 1 having a weight average molecular weight of 500,000 to 700,000:

[Chemical Formula 1]

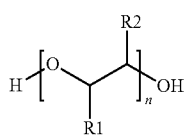

wherein:
R1 and R2 are the same as or different from each other, and each independently is hydrogen, deuterium, or a substituted or unsubstituted alkyl group;
n is from 10,000 to 20,000; and
wherein the material of Chemical Formula 1 is crosslinked with the hydrophilic polymer via the glutaraldehyde.

2. The composition for forming a reverse osmosis membrane protective layer of claim 1, wherein R1 and R2 are hydrogen.

3. The composition for forming a reverse osmosis membrane protective layer of claim 1, wherein the material is present in an amount from 0.3% by weight to 0.5% by weight based on a total weight of the composition for forming a reverse osmosis membrane protective layer.

4. The composition for forming a reverse osmosis membrane protective layer of claim 1, wherein the hydrophilic polymer is polyvinyl alcohol (PVA).

5. The composition for forming a reverse osmosis membrane protective layer of claim 1, wherein the hydrophilic polymer is present in an amount from 0.1% by weight to 10% by weight based on a total weight of the composition for forming a reverse osmosis membrane protective layer.

6. The composition for forming a reverse osmosis membrane protective layer of claim 1, wherein the crosslinking agent is present in an amount from 0.01% by weight to 10% by weight based on a total weight of the composition for forming a reverse osmosis membrane protective layer.

7. A method for preparing a reverse osmosis membrane comprising:
forming a polyamide active layer on a porous support to yield the reverse osmosis membrane; and
on the polyamide active layer forming a protective layer comprising a crosslinked product of a compound of the following Chemical Formula 1 crosslinked with a polyvinyl alcohol, wherein the crosslinked product comprises a reaction product of the polyvinyl alcohol with a crosslinking agent and the compound of Chemical Formula 1 having a weight average molecular weight of 500,000 to 700,000:

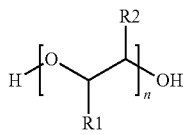

[Chemical Formula 1]

wherein:
R1 and R2 are the same as or different from each other, and each independently is hydrogen, deuterium, or a substituted or unsubstituted alkyl group; and
n is from 10,000 to 20,000.

8. A reverse osmosis membrane, comprising:
a porous support;
a polyamide active layer provided on the porous support to yield the reverse osmosis membrane; and
on the polyamide active layer a protective layer comprising a crosslinked product of a compound of the following Chemical Formula 1 crosslinked with a polyvinyl alcohol,
wherein:
the crosslinked product comprises a reaction product of the polyvinyl alcohol with glutaraldehyde as a crosslinking agent and the compound of Chemical Formula 1 having a weight average molecular weight of 500,000 to 700,000, and
the reverse osmosis membrane comprising the protective layer exhibits salt rejection of 99.89% or greater and boron rejection of 93% or greater:

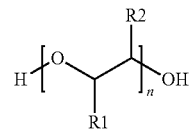

[Chemical Formula 1]

wherein:
R1 and R2 are the same as or different from each other, and each independently is hydrogen, deuterium, or a substituted or unsubstituted alkyl group; and
n is from 10,000 to 20,000.

9. The reverse osmosis membrane of claim 8, wherein the compound of Chemical Formula 1 is present in an amount from 5% by weight to 20% by weight based on a weight of the protective layer.

10. The reverse osmosis membrane of claim 8, wherein the polyamide layer in combination with the protective layer has an elastic modulus (Young's modulus) of 4.5 GPa to 10 GPa.

11. A water-treatment module comprising one or more of the reverse osmosis membranes of claim 8.

12. A water-treatment system comprising one or more of the water-treatment modules of claim 11.

13. The reverse osmosis membrane of claim 8, wherein the glutaraldehyde crosslinks the crosslinked product with a surface of the polyamide active layer, and the crosslinked product also is in a physically adsorbed form on the surface of the polyamide layer.

* * * * *